(12) United States Patent
Moore

(10) Patent No.: US 7,690,248 B2
(45) Date of Patent: Apr. 6, 2010

(54) MEASUREMENT OF PAPER STACK TOPOGRAPHY

(75) Inventor: Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/002,673

(22) Filed: Dec. 18, 2007

(65) Prior Publication Data

US 2009/0151435 A1 Jun. 18, 2009

(51) Int. Cl.
*G01B 5/28* (2006.01)

(52) U.S. Cl. .......................... 73/105; 73/159

(58) Field of Classification Search .................. 73/105; 33/559

See application file for complete search history.

(56) References Cited

U.S. PATENT DOCUMENTS 5,287,157 A * 2/1994 Miyazato et al. ............ 399/406
6,453,730 B2 * 9/2002 Takemura .................... 73/105
6,477,892 B1 * 11/2002 Lindig ........................ 73/105

\* cited by examiner

*Primary Examiner*—Hezron Williams
*Assistant Examiner*—Mark Shabman
(74) *Attorney, Agent, or Firm*—James J. Ralabate

(57) ABSTRACT

This is a probe that can be used to measure any curl on a stack of sheets in a sheet stacking tray. In printing systems including electrophotographic systems, sheets tend to curl on edge portions. This curl can adversely affect the final copy and copies fed to finishing stations.

This probe lightly contacts the upper stack surface and detects sheet curl especially on the edge portions of the stack. The probe measures deviations of the surface as compared to a starting point defined on the terminal edge of the stack. The information provided by the probe is then fed to a user or controlled for transmission to a correcting apparatus.

3 Claims, 3 Drawing Sheets

MEASUREMENT OF PAPER STACK TOPOGRAPHY

This invention relates to stacking trays and, more specifically, to measuring paper curls in stacking trays used in sheet feeding or finishing stations.

BACKGROUND

In many feeding and finishing modules in marking systems including electrostatic marking systems, a stack of sheets is generally being processed. The topography of the top of the stack is often a critical but uncontrolled factor. If the top of the stack is excessively non-planar in a feeder module, then feeder acquisition failures may occur. Stack non-planarity in a finisher may be indicative of poor quality of finished documents and may result in customer dissatisfaction in the end article. The predominant cause of stack surface non-planarity is sheet curl. Products within the high-end office and production markets typically have some decurling capability. In general, the system operator needs to confirm that the decurling capability is set appropriately for the media type and job type. This may involve visual inspection of the stack quality as it is formed within the finishing module. The operator is thus forced to 'close the loop' to assure that output quality will be acceptable to the end customer. A less subjective and labor intensive process than now exists would be preferable.

Various means have been suggested to measure the degree of curl and flatness at the top of the paper stack. This is important since sheet curl causes problems of handling as the sheet is processed in the feeding, printing or finishing module. Sheets delivered in a curled condition have a tendency to have their edges out of registration with the aligning mechanisms and other sheet moving systems employed in the printing machine. In addition, curled sheets tend to frequently produce jams or misfeeds within the feeding and printing modules, and especially within output sorting, stacking, collating, compiling and/or other sheet handling systems. Belts or soft rollers may be used in conventional prior art decurlers in which one or more paper paths are effective in reducing paper curls primarily in the direction of sheet travel . However, the setting of such decurlers is complex since paper curl is a function of many parameters. Furthermore, efficient and accurate measurement of paper curl of individual sheets as they are being processed is difficult, so that information needed to define the setting of decurlers is not readily available. By contrast, a measure of paper curl of a stack being formed within an output device provides an averaging effect over multiple sheets, thus enabling a more reliable, less noisy estimate of the sheet curl level. In a similar fashion, a measure of paper curl of a stack being drawn from within an input device enables the feeding mechanism to make adjustments to preferentially feed curled sheets.

A reliable, efficient method to measure the degree of curl on the top of a paper stack is therefore important to make a sheet processing system less sensitive to the effects of paper curl.

SUMMARY

This invention provides a means to measure the topography along the top edge of a paper stack. This measurement technique takes advantage of the observation that curl effects are often most pronounced along sheets' edges. The measurement process employs a low contact force probe that seeks the level of the top of the stack and is translated along a top edge of the stack. The probe height versus translation distance is measured and recorded. The total range of height seen is interpreted as the stack non-planarity along the measured edge. This result can then be communicated to the user, or preferably, to the responsible subsystem, so that corrective action can be taken if the stack is not sufficiently planar. If the stack is located within an input module, then the responsible subsystem may be a feeder mechanism. If the stack is located within an output module, then the responsible subsystem may be a decurler subsystem or a compiler subsystem. The measurement technique is described along one edge of a stack; however, this technique can also be applied along multiple edges of a stack.

In the case of an stack within an output module, corrective action once the curl measurement of this invention is completed can be taken and acted on by any known decurling process. Typical of these decurling processes are those methods described in U.S. Pat. Nos. 5,202,737, 5,287,157, 5,539,511 and 6,282,403. The disclosures of these decurling patents are incorporated by reference into this application. Since the sheets contained within the stack being measured have already passed through any upstream decurling mechanism, it is apparent that curl measurement of the stack will be used to adjust curl levels of subsequent sheets to be stacked. Provided that the stack curl measurement occurs early within the stack formation process, then it is possible to apply decurler setpoint updates within a run so that the completed stack becomes essentially flat.

The probe used in the present system travels horizontally over the top edge surface of the paper stack. The probe exerts a controlled low normal force on the edge surface thereby not significantly depressing or deforming the underlying stack. A very accurate measurement results because the probe rests lightly on the entire surface and accurately conveys the planar surface and curl conditions of the aggregate curl levels of each sheet contained in the stack. Also, paper feeding onto or off of the stack need not stop or be interrupted as the probe is operational. The probe uses a tip which rests on the top surface of the stack and a sensor which is capable of measuring the instantaneous height of the tip. In one embodiment a probe with a sensor that generates electrical pulses is used; however, any suitable conventional sensor may be used. The probe as earlier mentioned is freely suspended from a support so that it exerts little or no pressure to deform the stack top surface.

In the measurement method herein used, the probe height at the start of a scan can be defined as the reference or "0" height of the probe. As the probe moves horizontally across the paper stack edge surface, it measures the deviation from the "0" location; thus, measuring the amount of curl in the surface or the degree of surface flatness. This measurement deviation is recorded and then fed to a controller so that corrective decurling action may be taken. The controller in one embodiment of this invention comprises logic, software and communication means to both receive and take corrective action on the probe measurements. Any suitable controller and software may be used. The probe can convey either analog or digital information concerning the curling conditions on the surface. The controller will either automatically correct for the measured curl level or indicate to the user the corrective action needed.

It is critical to this invention that the probe transport run substantially the entire length of the paper surface being measured and that the probe ride freely on this surface while exerting a controlled low normal force on the surface. If excessive pressure was exerted, the probe would deform the stack and thus not convey a true surface condition.

The magnitude of the "controlled low normal force" is determined in the following manner. A force level F is selected which is greater than the force needed to deflect a single sheet of the lightest material to be stacked. The force level F is also selected to be lower than the force needed to deflect N sheets of the lightest material, where N is a design parameter which is greater or equal to 2. Thus the probe tip is capable of compressing and deforming a top sheet of the stack so that it conforms with the stack below it. The probe tip does not have sufficient force to deform the underlying sheets below the top sheet. In this manner, an accurate representation of the stack topography is achieved.

The probe in an embodiment comprises a front portion and a back portion, said front portion enabled to contact said surface being measured and said back portion operatively connected to a sensor, said sensor adapted to measure the vertical movement or displacement of said probe as it travels over said surface, said sensor also enabled to convey said displacement to a controller for corrective action. Any suitable sensor can be used in this invention.

The probe can be made from a lightweight material such as lightweight metal or lightweight plastic. The probe can be counter-balanced in order to control its tip normal force on the stack. Further, the probe can be preloaded using gravity, spring force, or the like in order to achieve the controlled tip normal force on the stack.

DETAILED DISCUSSION OF DRAWINGS AND PREFERRED EMBODIMENTS

Figure 1:
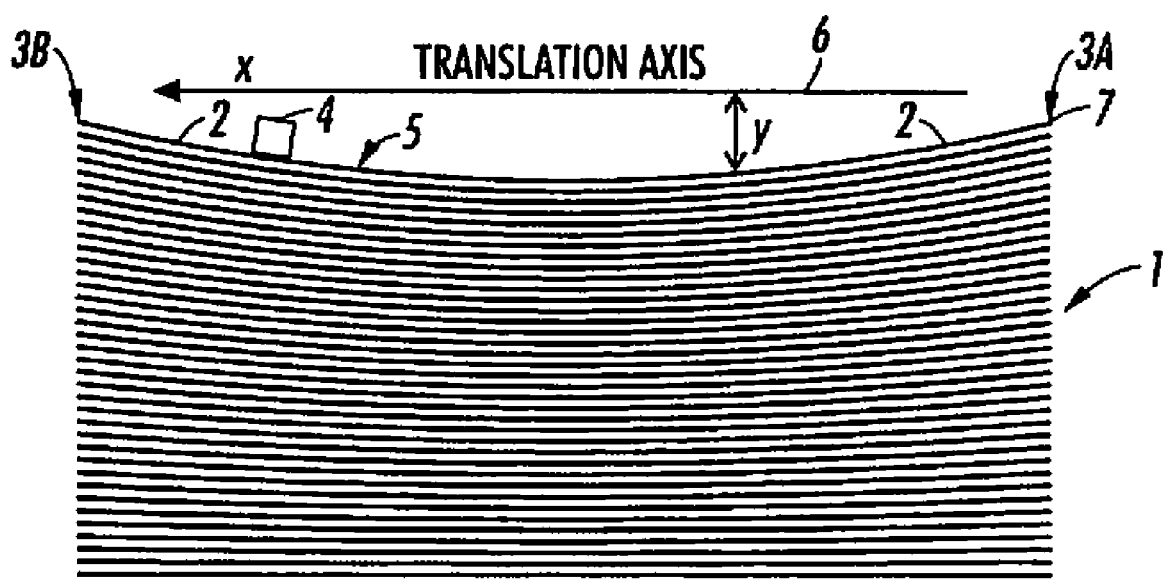
FIG. 1 illustrates a side view of a non-planar stack and the measurement axes employed by an embodiment of this invention.

In FIG. 1 an exemplary side view of a non-planar paper stack 1 and the measurement axes X and Y are employed by an embodiment of this invention. The predominant cause of stack surface non-planarity is sheet curl 2, that often is most pronounced along axis X. The probe height Y versus translation distance X is shown as the probe 4 moves across the surface 5 in the direction of arrow 6. The probe starts its travel at starting point 7 and measures all other surface heights along arrows 6 locations as they deviate from the measurement standard location of starting point 7. Once the probe 4 is positioned over the stack surface 5, an actuator allows the probe to drop onto the stack surface 5. As the probe 4 completes its scan, the probe 4 drops off the stack at its left end 3B. The X-axis could be aligned with the process direction of the printing system. FIG. 1 represents a front or back view of the stack 1. Since curl is generally oriented in the manner shown in FIG. 1, this is the preferred orientation for stack surface 5 measurements.

Figure 2:
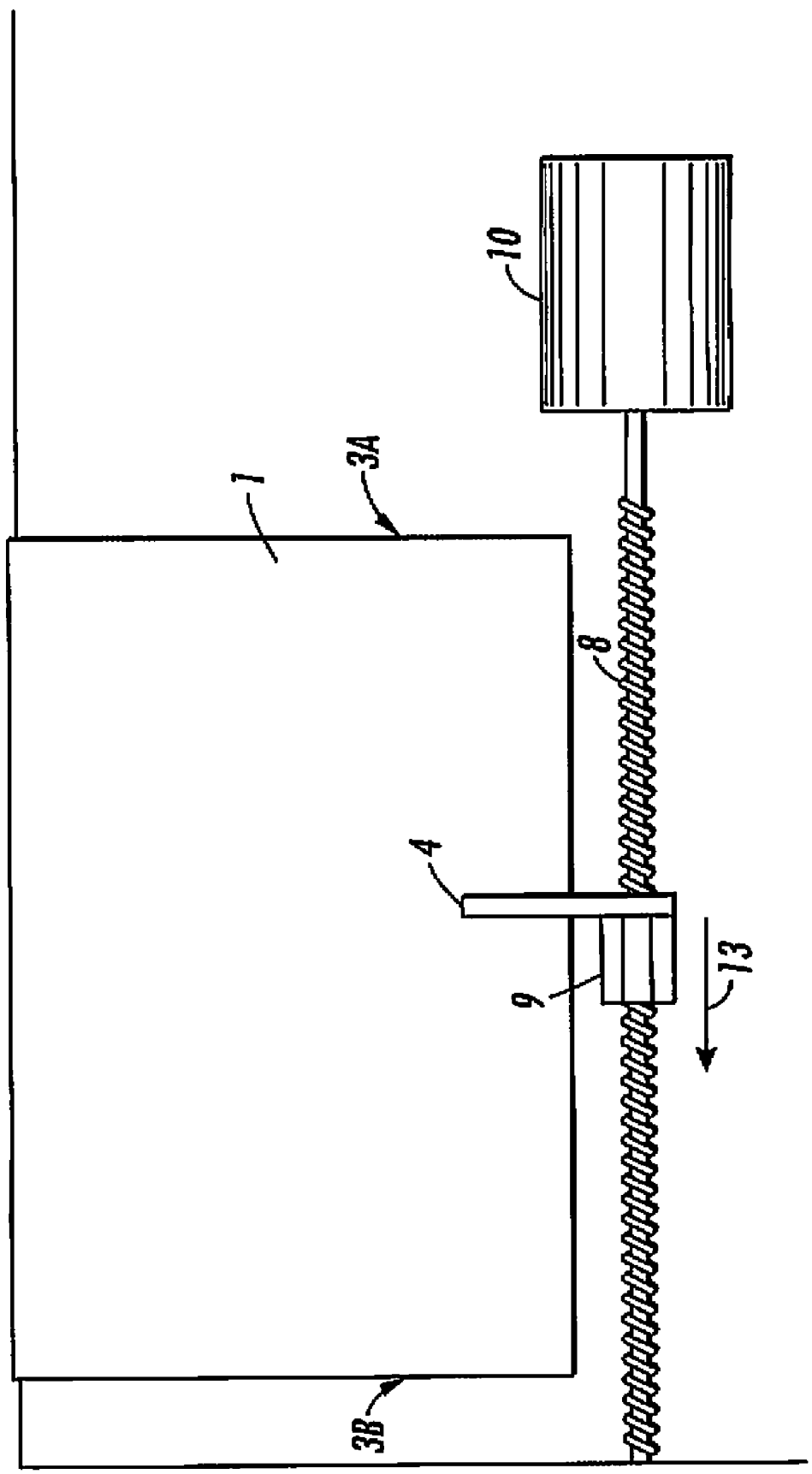
FIG. 2 illustrates a top view of the paper stack and a schematic view of an embodiment of a measurement system of this invention.

FIG. 2 shows a top view of the stack 1 and a schematic view of the measurement system. Sensing probe assembly 4 is located on a linear actuator. Shown here is a lead screw actuator 8, although a timing belt drive or a rack and pinion drive could likewise be used. The probe assembly 4 is located on the nut of the lead screw 8. As the drive motor 10 turns, the nut 9 traverses parallel to the adjacent stack edge 5. The probe assembly 4 includes a probe tip that engages the stack 5 and rides over the top sheet. The probe tip is biased with light preload as previously discussed to ensure that it follows the topography of the top of the stack without influencing the stack height by compressing the stack. Also contained in the probe assembly is an incremental encoder that records the height of the probe tip relative to a vertical datum, such as the lead screw axis. The final component within the probe assembly 4 is a small actuator which can selectively lift the probe off of the stack or drop the probe onto the stack. Note that this probe assembly 4 is somewhat analogous to the 'set separator' feature which prior art recirculating document handling devices have used to verify completion of set feeding.

Next, the operation of the measurement system is described. Referring to FIG. 2, assume the nut 9 is initially located at the extreme right end 3A of the lead screw 8. The motor 10 next advances the nut 9 to the left. The actuator 14 is in the 'lift' state so the probe elevation is above the nominal stack height. The probe 4 next is translated onto the right end of the stack. Note that this movement can be coordinated with the transport which is either supplying sheets to the stack 1 or removing them from the stack. The time when the probe 4 traverses onto the stack 1 is preferably within an intercopy gap time of the transport so that the probe 4 does not interfere with the stacking or feeding function. Once the probe 4 is over the stack 1, the actuator allows the probe to drop onto the stack. The motor 10 next translates the nut 4 to the extreme left end of travel of the lead screw 8. As it does so, the output of the incremental encoder is monitored as a function of the traverse distance. Finally, the probe 4 drops off of the stack at its left end 3B and the measurement cycle is complete. The probe 4 is stationary until another topography measurement is requested. It then repeats the above measurement procedure but in a left to right direction.

It should be noted that the measurement system described can cope with several potential disturbances. It is quite possible in a finisher that additional sheets could be placed onto the stack while the measurement traversal is occurring. These sheets simply land on top of the probe tip, which continues to measure the height variation of the sheet it had started on. Additionally, if the stack elevator control raises or lowers the stack during the measurement traversal, the measurement control logic can easily account for this offset. The arrow 13 shows the direction of nut 9 during the measurement operation. A sensor 12 (FIG. 3) tells if the probe or finger 4 goes up or down from start point 7.

Figure 3:
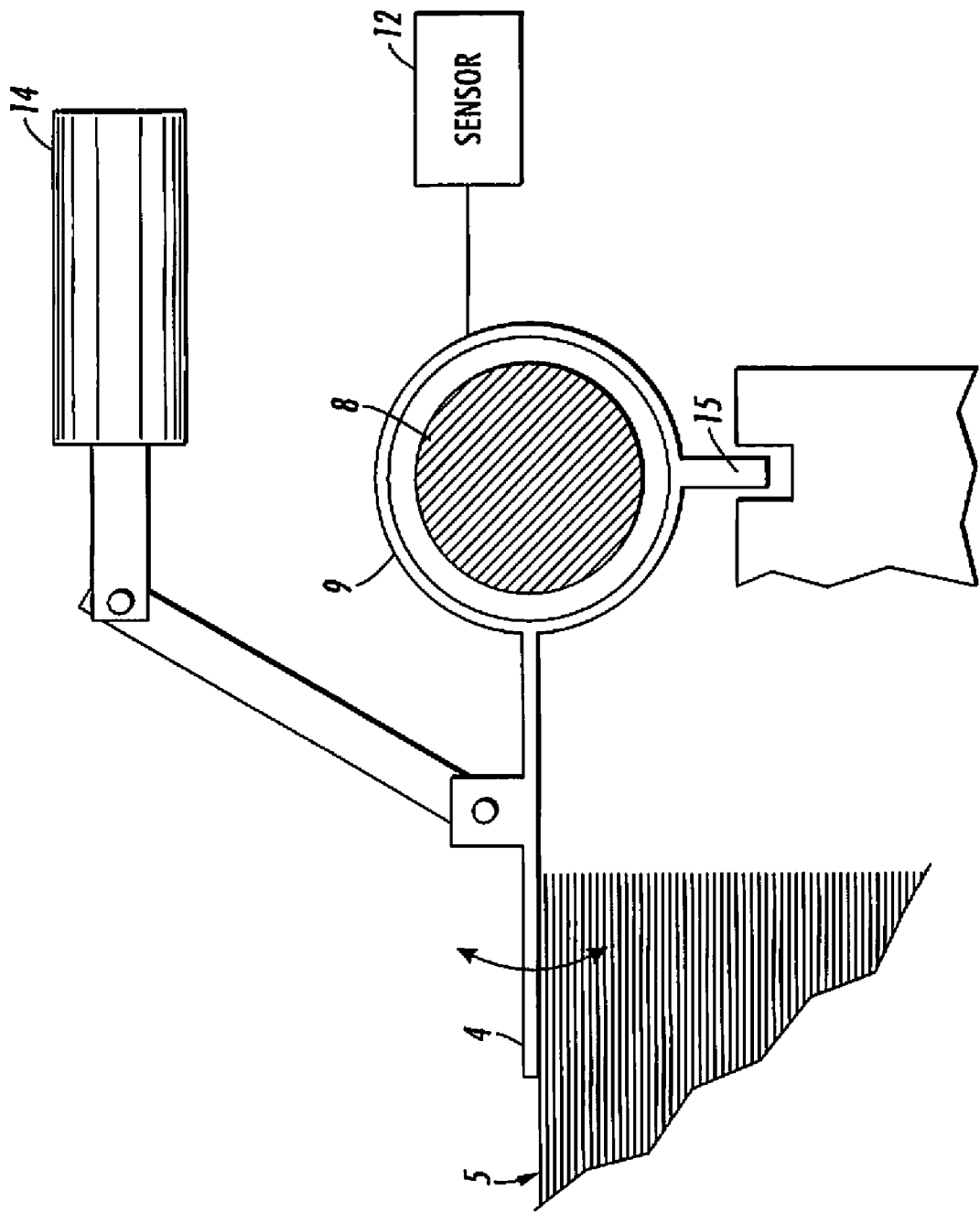
FIG. 3 illustrates an exemplary cross-section view of a probe assembly useful in this invention.

FIG. 3 shows an exemplary cross-section view of a probe assembly. The probe 4 is located upon nut 9 but free to pivot about the nut 9 allowing the probe tip 4 to rest on the stack 1. A solenoid and linkage 14 can serve as the lift actuator. When the solenoid 14 is energized, its plunger pulls into the solenoid body, which causes the lift link to rotate the probe tip upward off of the stack surface. When the solenoid 14 is de-energized, the plunger releases from the solenoid body, allowing the lift link to drop the probe tip onto the stack. An anti-rotation tab 15 is located within a slot in a stationary frame and prevents rotation of nut 9 while lead screw 8 is being rotated. This forces nut 9, and thus probe 4, to traverse along the length of lead screw 8 when lead screw 8 is rotated by motor 10. As the tip 4 lowers or lifts, output transitions will occur at each sensor output 12 which can be quadrature decoded to indicate both the tip's angular displacement and direction of motion. The measurement system is located adjacent to the top of the stack 5. In a feeder or finisher module, the top of the stack 5 is usually kept at a near constant elevation. This means the measurement system will be adjacent to the transports associated with delivering or removing sheets from the stack. The measurement mechanism will, therefore, reside above the module volume that the operator will need to access for stack loading or unloading. If measurement is done along the process direction as depicted here, clearly the measurement mechanism needs to accommodate various cross-process sheet widths. Preferably the entire measurement mechanism can be automatically shifted in the cross-process direction to maintain the same relative position to the edge of the stack. Since the mechanism is modular, compact, and has noncritical positioning requirement, it is expected that a relatively simple open loop mechanism (not shown) could be used to shift the mechanism. In some instances, such as an edge registered system, shifting of the mechanism in the cross-process direction may not be required Several parameters, including probe tip force, probe tip geometry, encoder resolution, probe height range, and translation speed, are design variables that can be selected to fit a particular application. As stated earlier, the probe is intended to be non-interactive with the feeding/stacking function. This allows, for instance, a relatively slow translation time that spans multiple system pitch cycles. A slow translation time will help prevent any dynamic behavior of the probe and will produce a low noise output. Additionally, the scheduling of measurement scans is a system parameter that will occur every N sheets, where N is a function of sheet basis weight and possibly other factors.

In summary, this invention describes the problem of detecting stack curl in a low cost, low noise, highly reliable manner.

To summarize, embodiments of this invention provide a paper stack surface measurement system comprising a paper tray having an opened top section adapted to house a stack of papers in the tray, an upper stack surface, a surface measuring and sensing probe, a probe transport and a system controller.

The measuring probe is enabled during a measuring operation to be transported and moved adjacent to and along an axis parallel with the stack surface. The probe is in floating contact with the stack surface and is enabled to move from a starting location along in contact with the entire length of a stack top edge to generate surface condition information including paper curl. The probe is enabled to measure surface deviations from a fixed point on the surface, and enabled to transmit the deviations to the controller.

The upper stack surface comprises at its edge portions at least some paper curled sections. The probe, which is freely suspended on a probe transport, extends through a length of the stack to be measured and imparts a controlled low normal force on the stack surface during the measuring operation. It floats over depressions, curls and rises on the surface, measuring the topography along at least one top edge of a stack of papers in the tray by comparing it to the probe in its starting location. It will detect any curls in the stack surface by transporting the probe adjacent to and along an axis parallel with the upper stack surface edge and will then transmit surface information to the system controller.

The probe comprises a front and a back section; the front section is enabled to contact the surface being measured. The probe back portion is in operative connection with a sensor which is adapted to measure vertical movement or displacement information of the probe as it travels over the surface and to convey the displacement to the controller.

A motor is operably connected to a movable lead screw actuator which supports a nut with the attached probe. The nut is adapted to traverse parallel to the stack edge and enables the probe to engage and lightly ride over the upper stack surface, measuring the topography along at least one top edge of a stack of papers in the stacking tray. The sensor measures and transmits to the controller information on the probe's angular displacement and direction of motion across the stack surface. The controller then transmits the information to a decurling system for corrective action.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for measuring the curl of a sheet of paper on a top of a substantially stationary stack of paper sheets comprising:
    positioning a horizontally movable probe over said stack;
    positioning said probe on a movable actuator transport;
    moving said probe across a top surface of the stack along an axis substantially parallel to one edge of the stack;
    exerting a controlled low contact force where said force is insufficient to deform said stack surface;
    providing a sensor to measure said probe's angular displacement and direction of motion across said stack;
    providing a controller in informational contact with said sensor;
    recording via said sensor the height of the probe relative to a reference height; and transmitting the recorded height measurements to said controller.

2. The method of claim 1 wherein said probe is moved over curls and rises on said stack surface and measures them when compared to a probe starting location.

3. The method of claim 1 wherein said probe is provided as a suspended probe that has a probe force when in contact with said stack surface which is insufficient to deform said stack surface whereby said probe thereby conveys a true topography of said stack surface to a controller.

* * * * *